United States Patent [19]
Tharaldsen

[11] 3,822,607
[45] July 9, 1974

[54] DEVICE FOR THE LUBRICATION OF TOOTH FLANKS OF GEAR WHEELS

[76] Inventor: Nils Fr. Tharaldsen, Harald Lovenskiolds vei 42, Oslo 7, Norway

[22] Filed: July 13, 1972

[21] Appl. No.: 271,224

[30] Foreign Application Priority Data
July 15, 1971 Norway............................ 2716/71

[52] U.S. Cl.............................. 74/468, 184/6.12
[51] Int. Cl............................................ F16h 57/04
[58] Field of Search............ 74/467, 468; 184/6.12

[56] References Cited
UNITED STATES PATENTS
3,361,003  1/1968  Hodgson............................ 74/468
3,365,913  1/1968  Shields.............................. 184/6.12
3,424,022  1/1969  Greenberg et al..................... 74/468
3,454,136  7/1969  Stark................................. 184/6.12
3,516,298  6/1970  Arndt................................. 74/468

Primary Examiner—Samuel Scott
Assistant Examiner—Allan Russell Burke
Attorney, Agent, or Firm—Laurence R. Brown

[57] ABSTRACT

A device for lubrication of the tooth flanks of gear wheels, comprising a freely running toothed or spiked applying wheel each tooth or set of spikes corresponding to a tooth being provided with a plurality of radial passages each having one single outlet opening in the flank of the respective tooth or spike and the inlet openings of the said passages being successively brought in communication with a source of lubricant under pressure.

2 Claims, 10 Drawing Figures

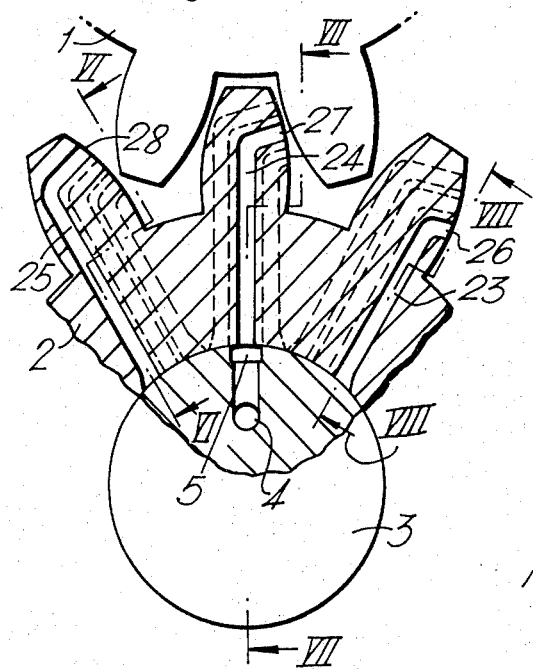
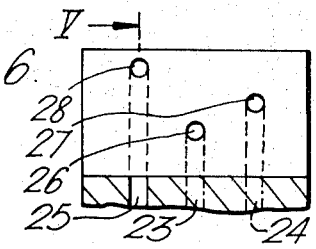
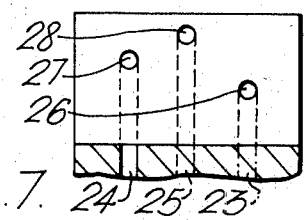
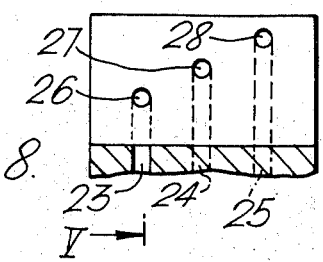
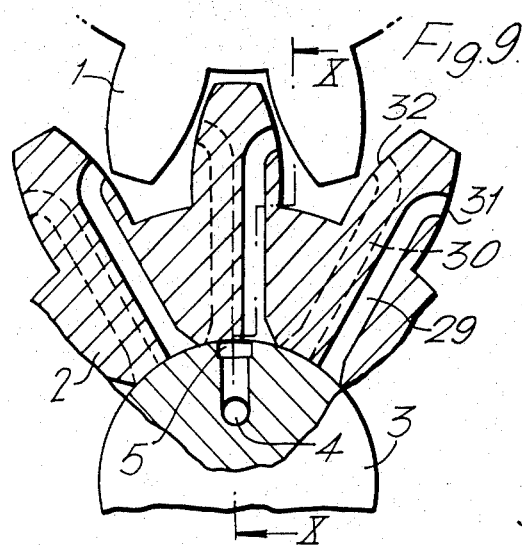
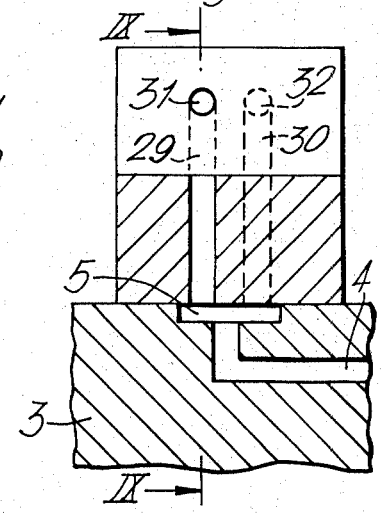

DEVICE FOR THE LUBRICATION OF TOOTH FLANKS OF GEAR WHEELS

The present invention relates to a device for the lubrication of tooth flanks of gear wheels by means of a toothed or spiked lubrication applying wheel, lubricant being fed through passages and grooves in the shaft of the applying wheel and further through substantially radial passages in the applying wheel.

A lubrication device of this kind has previously been proposed in which the applying wheel is provided with a plurality of radial passages which do all have their outlet opening at the tooth roots of the applying wheel. This device is particularly adapted for systems where the applying wheel is intended to rotate at high speeds and the lubricant is of relative low viscosity, the lubricant being fed to the zone of engagement with the wheel to be lubricated under the influence of centrifugal force.

In an other previously proposed lubricating device of the above kind each tooth of the applying wheel is provided with a single radial passage which at its outlet opening has a pressure plate intended to distribute the lubricant over the width of the tooth flank. In order to distribute the lubricant over the height of the tooth flank each passage is provided with several outlet openings. Also this known device is intended for relatively low-viscous lubricants.

The present invention has for its object a lubricating device of the kind referred to above and being suitable for more viscous lubricants, e.g. grease, the purpose being to provide a good distribution of the lubricant over the tooth flank faces of the wheel to be lubricated.

According to a main aspect of the invention the applying wheel, for each tooth or each set of tooth-corresponding spikes, is provided with at least two separate passages, each passage having merely one outlet opening, the inlet opening to the passages being so arranged relative to the direction of the groove in the shaft surface that the passages of each set of passages, during rotation of the applying wheel, are successively brought in communication with said groove.

The outlet openings of the passages in each tooth may be disposed at equal radial distances from the wheel axis, the outlet openings of the passages of the respective teeth, i.e., of the respective sets of passages, being radially offset with respect to each other or — alternatively — being disposed on the same radial distance.

Alternatively the outlet openings of the passages of each tooth may be radially offset with respect to each other, the mutually corresponding outlet openings in successive teeth being disposed on the same or different radial distances from the axis of the applying wheel.

When the gear wheel to be lubricated is intended for running alternatingly in either direction the applying wheel may, according to one aspect of the invention, be so disposed that the outlet openings of the passages of any one tooth faces alternatingly in different peripheral directions, so that lubricant is fed to both flanks of each tooth or spike of the applying wheel.

With a lubricating device according to the invention a good and controlled distribution of the lubricant over the tooth flanks of the gear wheel to be lubricated is achieved, even when the lubricant used is comparatively viscous, e.g. grease. By providing the passages in the applying wheel with merely one outlet opening and by making these passages to successively come in communication with the feed passage and groove in the shaft of the applying wheel, the lubricant will be forced out at the respective outlet openings at substantially equal pressure. In other words it is provided for correct dosage of lubricant at all outlet openings at the respective required times.

Some embodiments of the invention shall now be described with reference to the accompanying drawings in which:

FIGS. 1 and 2 are an end view partially in section and an axial section through an applying wheel according to the present invention, the sections being made along line I—I in FIG. 2 and line II—II in FIG. 1, respectively.

FIGS. 3 and 4 are views and sections corresponding to those in FIGS. 1 and 2, along lines III—III in FIG. 4 and IV—IV in FIG. 3, FIGS. 3 and 4 showing a different embodiment of the invention.

FIGS. 5 and 6 to 8 are views and sections corresponding to those in FIGS. 1 and 2, along lines V—V in FIGS. 6 to 8 and VI—VI, VII—VII and VIII—VIII in FIG. 5, FIGS. 5 to 8 showing yet another embodiment of the invention.

FIGS. 9 and 10 are views and sections corresponding to those in FIGS. 1 and 2, along lines IX—IX in FIG. 10 and X—X in FIG. 9.

Figure 1:
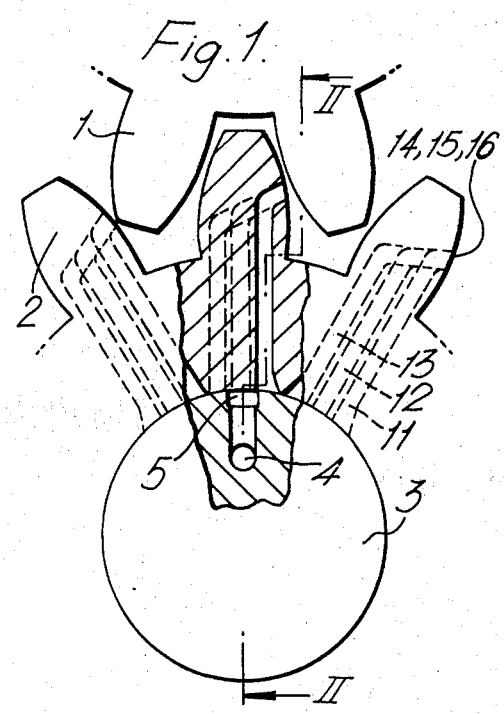

On the drawings a gear wheel 1 is indicated, the flanks of which are to be lubricated by means of the device of the present invention. This device comprises, in the embodiments shown, a toothed wheel 2 running freely on a shaft 3 through which extends a substantially axial passage 4 which at the shaft end is connected to a lubricant source not shown and which radially inward of the applying wheel 2 opens into a longitudinal groove 5 in the surface of the shaft. In the applying wheel 2 is provided a plurality of substantially radial passages which will be further referred to in the following and which are adapted to be brought successively in communication with the groove 5 during the rotation of the applying wheel 2 which is rotated by the tooth engagement with the wheel 1 to be lubricated.

In the embodiments shown the groove 5 extends parallel to the axis of the shaft 3, and the inlet openings of the passages of each tooth are then angularly offset with respect to each other. In an alternative embodiment not shown the groove 5 follows a helical path along the shaft surface and in this case the inlet openings of each set of passages in the applying wheel are then disposed along a line parallel to the axis of the wheel.

Figure 2:
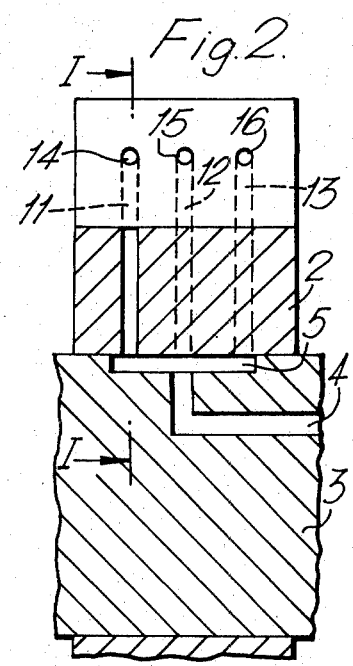

FIGS. 1 and 2 show an embodiment of the applying wheel 2 in which each tooth is provided with three passages 11, 12 and 13 the outlet openings 14, 15 and 16, respectively, of which are disposed on the same radial distance from the axis of the applying wheel. The outlet openings 14 to 16 on each tooth may be disposed on the same radial distance from the shaft as are the outlet openings on the other teeth of the wheel, or the outlet openings on one tooth may be radially offset with respect to the outlet openings on adjacent teeth.

Figure 3:
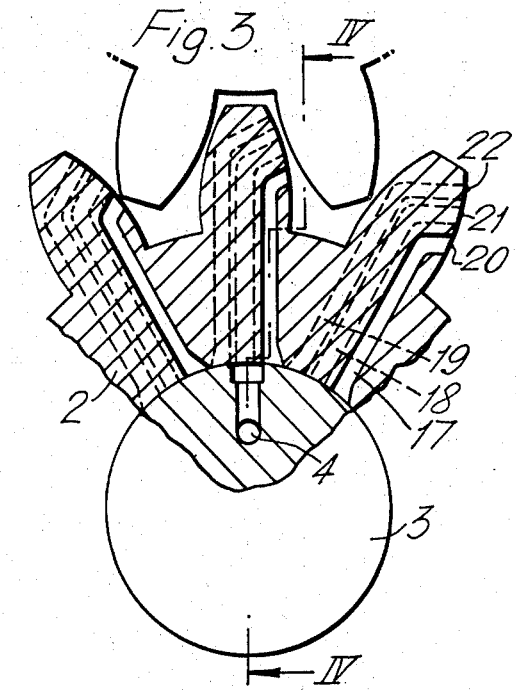
Figure 4:
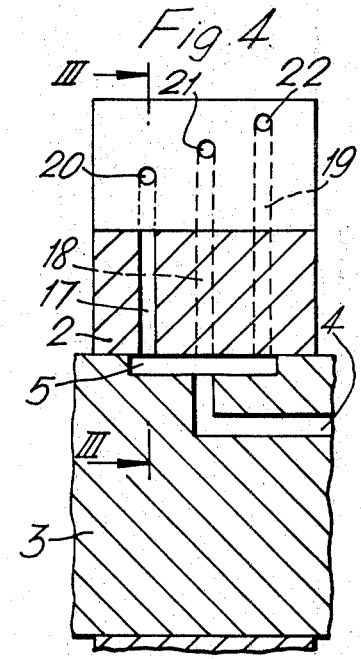

FIGS. 3 and 4 show an embodiment of the applying wheel 2 in which three passages 17, 18 and 19 are provided in each tooth, the outlet openings 20 to 22 of each set of passages being radially offset with respect to each other and each tooth being provided with identical arrays of outlet openings.

FIGS. 5 to 8 show a further embodiment of the applying wheel 2 in which three passages 23, 24 and 25 are provided in each tooth the outlet openings 26 to 28 of the passages in any one tooth being radially offset with respect to each other and the array of outlet openings on the teeth being different from tooth to tooth.

FIGS. 9 and 10 show yet another embodiment of the applying wheel 2, in which each tooth is provided with two passages 29 and 30 the outlet openings 31 and 32 of which are disposed at the same radial distance from the axis of the wheel and one opening in each flank of the tooth. This embodiment is specifically intended for the lubrication of gear wheels intended to run alternatingly in different directions, so that lubricant is fed to both flanks of the teeth of the gear wheel to be lubricated.

In the embodiments shown the applying wheel 2 is shown as a "regular" gear wheel. In an alternative embodiment the applying wheel may be in the form of a spiked wheel in which each of the substantially radial passages (e.g. the passages 11 to 13) are disposed in substantially radial spikes mounted on the hub of the applying wheel, the passages being provided with each one outlet opening in tooth flank corresponding faces of the respective spikes, such tooth flank corresponding faces together forming a "tooth flank" for the respective set of spikes.

I claim:

1. In a device for the lubrication of tooth flanks of two meshing gear wheels that contact each other with one said gear wheel rotating on a shaft having a lubrication flow passageway defined therein to present lubricant to the gear wheel rotating thereon comprising a toothed lubrication applying wheel defining therein radial passages disposed for feeding lubricant from the shaft through the substantially radial passages in the applying wheel by means of inlet openings leading into the radial passages being defined in the wheel and out of outlets opening out in the surfaces of flanks of the teeth of the applying wheel to thereby feed said lubricant from said shaft passageway into successive inlet openings and out respective successive tooth flanks to lubricate the meshing flank surfaces as the wheel is rotated, the improvement comprising in combination, each tooth being provided with at least two separate passages circumferentially spaced about said shaft to successively encounter said passageway feeding lubricant in the shaft with each passage defining only one outlet opening, the respective passages having outlet openings axially spaced and radially offset with respect to each other on the same tooth flank, whereby the inlet openings on the wheel are so arranged relative to the passageway in the shaft that each passage into the wheel, during rotation of the applying wheel, is successively brought into communication with said passageway in the shaft.

2. A device as defined in claim 1 wherein said radial passages are directed only toward the face of said tooth flanks that mesh with and drive another tooth on the other said gear wheel.

* * * * *